United States Patent

Borg

[11] Patent Number: 5,833,466
[45] Date of Patent: Nov. 10, 1998

[54] DEVICE TO FACILITATE ALTERNATIVE RESPONSE BEHAVIOR

[76] Inventor: Charles Borg, 55 Harbour Sq., Toronto, Ontario, Canada, M5J 2L1

[21] Appl. No.: 295,846
[22] PCT Filed: May 6, 1993
[86] PCT No.: PCT/CA93/00209
  § 371 Date: Aug. 31, 1994
  § 102(e) Date: Aug. 31, 1994
[87] PCT Pub. No.: WO94/00831
  PCT Pub. Date: Jan. 6, 1994

[30] Foreign Application Priority Data

Jun. 23, 1992 [CA] Canada ..................... 2072040

[51] Int. Cl.⁶ ............................................... G09B 19/00
[52] U.S. Cl. ....................... 434/236; 434/238; 131/270
[58] Field of Search ..................... 434/236–238; 131/270, 329

[56] References Cited

U.S. PATENT DOCUMENTS

| | | | |
|---|---|---|---|
| 3,655,325 | 4/1972 | Toppel | 434/236 |
| 3,782,006 | 1/1974 | Symmes | 434/236 |
| 4,037,719 | 7/1977 | Perlmutter . | |
| 4,100,401 | 7/1978 | Tutt et al. . | |
| 4,144,568 | 3/1979 | Hiller et al. . | |
| 4,151,831 | 5/1979 | Lester . | |
| 4,246,913 | 1/1981 | Ogden et al. | 434/236 |
| 4,281,389 | 7/1981 | Smith . | |
| 4,285,041 | 8/1981 | Smith . | |
| 4,311,448 | 1/1982 | Strauss . | |
| 4,459,036 | 7/1984 | Sado et al. . | |
| 4,518,267 | 5/1985 | Hepp . | |
| 4,620,555 | 11/1986 | Schwarz . | |
| 4,717,343 | 1/1988 | Densky . | |
| 4,853,854 | 8/1989 | Behar et al. . | |
| 5,217,379 | 6/1993 | Kirschenbaum et al. | 131/270 |

FOREIGN PATENT DOCUMENTS

| | | |
|---|---|---|
| 8703788 | 7/1987 | WIPO . |
| 8900416 | 1/1989 | WIPO . |
| 9212490 | 7/1992 | WIPO . |

Primary Examiner—Richard J. Apley
Assistant Examiner—Glenn E. Richman
Attorney, Agent, or Firm—Riches, McKenzie & Herbert

[57] ABSTRACT

A device and method for assisting people in changing their behaviour and in particular assisting people to stop performing an acquired behavioural response such as using tobacco products, using alcohol, or over-eating is disclosed. The device and method interrupt a user's acquired behavioural response to stimuli before a decision regarding a course of action is made. A set of symbols representing alternative responses to the acquired behavioural responses is then displayed to the user to encourage the user to perform an alternative response. The user acknowledges whether the acquired behavioural response was performed or whether one of the alternative behavioural responses was performed. The device records the number of times either response was performed for later analysis and record keeping.

20 Claims, 5 Drawing Sheets

DEVICE TO FACILITATE ALTERNATIVE RESPONSE BEHAVIOR

BACKGROUND OF THE INVENTION

This invention relates to a device and method to assist a person in changing their acquired behavioural responses to stimuli. The acquired behavioural responses which a person might wish to change could be associated with use of tobacco products, alcohol, drugs or over-eating, or in the presence of stress or phobias.

In the past, many behavioural modification systems which were intended to assist a person to stop performing a particular behaviour have simply offered different ways of eliminating the ability of a person to perform that type of behaviour. Other behavioural modification systems simply counted the number of times a person has performed a particular acquired behavioural response in order to encourage the person to decrease the number over time. However, by simply denying people the ability to behave in a particular way, or counting the number of times people behave in a particular way in order to encourage them to stop behaving in that way, causes people to experience feelings of deprivation and void which form what is sometimes referred to as the abstinence syndrome.

Even if physical cravings have subsided, or have been satisfied in another way, familiar events in people's daily lives trigger psychological and habitual cues which create urges to perform the acquired behavioural response. When faced with these urges, people tend to apply "raw" willpower to deny or resist the urges. Indeed, all of the prior art devices rely exclusively on the user's willpower to overcome the "urges". This often causes people to feel a sense of void and to negotiate with themselves as to whether or not they should perform the acquired behavioural response. Negotiating with themselves leads the users of the prior art devices to focus on the one behavioural response which they should not perform. This leads to cognitive distortion—short sighted and twisted reasoning—and to the rationalization that "I'll have just one more".

In this way, people tend to find it much more difficult to stop performing a particular acquired behaviour response whether that behaviour is using tobacco products, drinking alcohol, over-eating or other behaviours. This difficulty leads to a higher incidence of failure.

SUMMARY OF THE INVENTION

Accordingly, it is an object of this invention to at least partially overcome the disadvantages of the prior art. Also, it is an object of this invention to provide an alternative type of behavioural modification device and method which does not require people or users to exert "raw" willpower to overcome urges to perform acquired behavioural responses. It is an object of this invention to provide a device which assists the user to substitute alternative responses for acquired behavioural responses when the user experiences an urge to perform an acquired behavioural response.

Accordingly, in one of its broad aspects, this invention resides in providing a user-interactive device for promoting alternative responses to acquired behavioural responses comprising:

a user-activatable input means for generating signals upon activation by a user, including a first signal representing an occurrence of an urge of the user to perform an acquired behavioural response;

a display means for displaying a set of alternate response symbols representing alternative responses to the acquired behavioural response;

a control means connected to the input means to receive signals, including the first signal, from the input means; and wherein said control means is operable to cause the display means to display the set of symbols after receiving the first signal.

Further aspects of the invention reside in providing a method for promoting alternative responses to acquired behavioural responses by use of a user-interactive device which a user interacts with, said method comprising:

user-activating said device upon an occurrence of an urge of the user to perform an acquired behavioural response;

displaying to the user a set of alternate response symbols representing alternative responses to the acquired behavioural response;

prompting the user to select and input into the device whether to perform the acquired behavioural response or to perform one of the alternative responses;

inputting into the device whether the user selected to perform the acquired behavioural response or whether the user selected to perform one of the alternative responses; and displaying to the user a positive symbol if the user selected to perform one of the alternative responses, and displaying to the user a negative symbol if the user selected to perform the acquired behavioural response.

A further aspect of the invention resides in providing a user-interactive, smoking reduction system for promoting alternative responses to smoking, comprising;

a user-activatable input means for generating signals upon activation by the user, including a first signal representing an occurrence of an urge of the user to smoke;

a display means for displaying a set of alternate response symbols representing alternative responses to smoking;

a control means connected to the input means to receive signals, including the first signal, from the input means; and wherein said control means causes the display means to display the set of symbols after receiving the first signal.

Further aspects of the invention will become apparent upon reading the following detailed description and the drawings which illustrate the invention and preferred embodiments of the invention.

BRIEF DESCRIPTION OF THE DRAWINGS

In the drawings, which illustrate embodiments of the invention.

DETAILED DESCRIPTION OF PREFERRED EMBODIMENTS OF THE INVENTION

Figure 1:
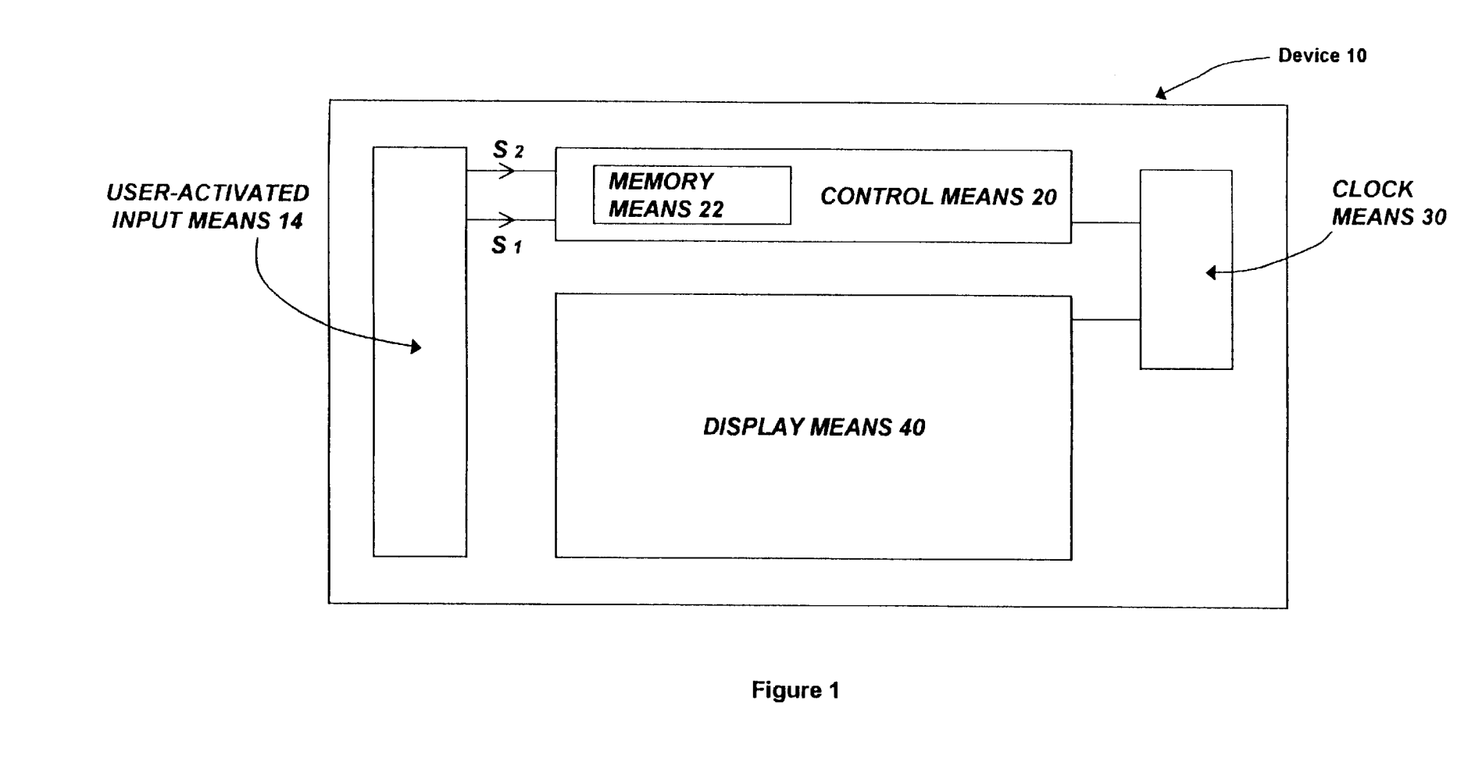
FIG. 1 is a conceptual representation of one embodiment of the present invention.

As shown in FIG. 1, in one embodiment the present invention comprises a user-interactive device 10 for prompting alternative responses to acquired behavioural responses. In this embodiment, the device 10 comprises a user-activatable input means 14, a display means 40 and a control means 20.

The input means 14 is capable of generating signals including a first signal S1 and a second signal S2. The control means 20 is connected to the input means 14 such that the signals generated by the input means 14 are received by the control means 20. The input means 14 and control means 20 can be fashioned from known electronic equipment such as an input/output integrated circuit and a central processing integrated circuit (not shown).

Figure 2:
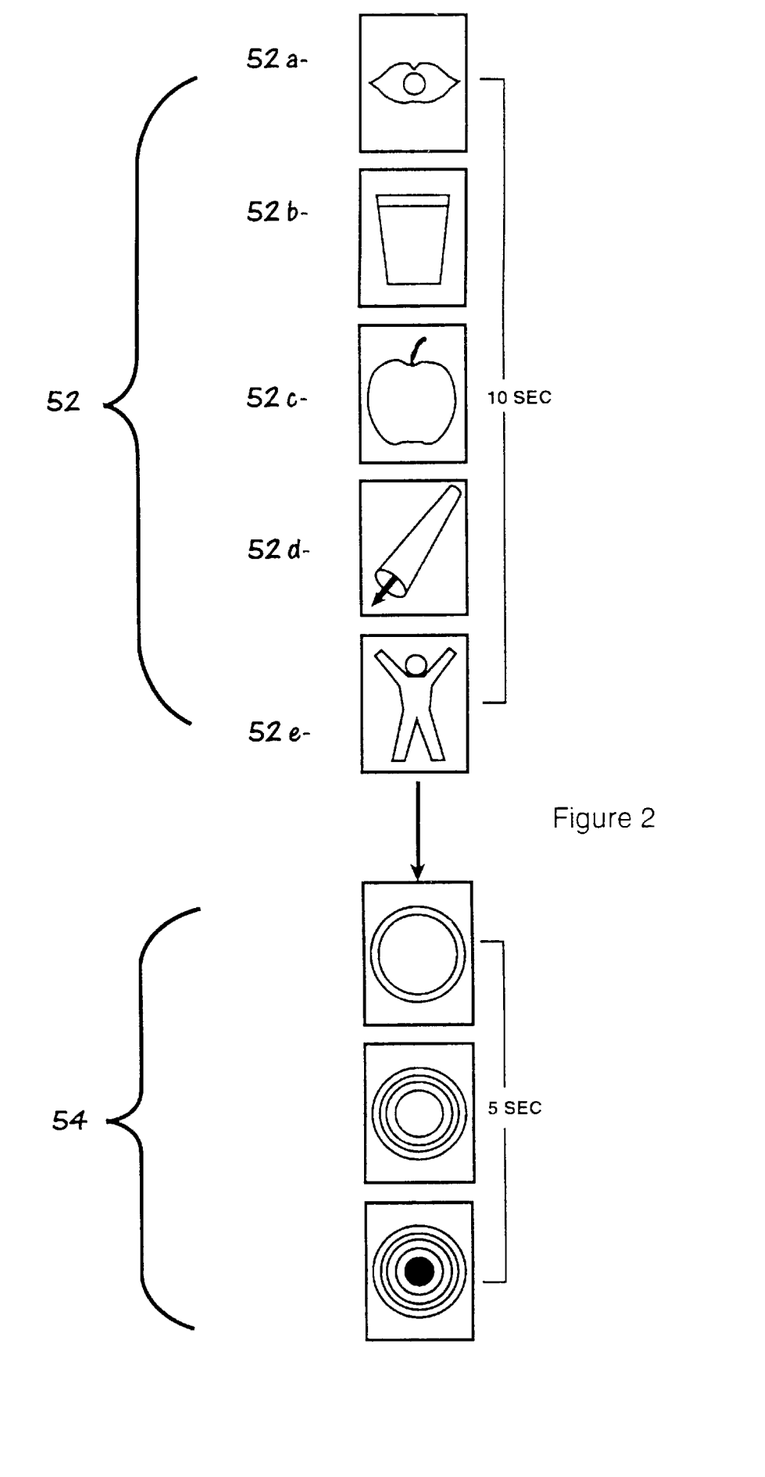
FIG. 2 is a drawing of the symbols used in one embodiment of the present invention.

The display means 40 is capable of displaying a set of alternate response symbols which are shown generally as 52 in FIG. 2. The set of alternate response symbols 52 can comprise one or more individual symbols. Each symbol in the set of alternate response symbols 52 represents an alternative response the user may perform as a substitute for the acquired behavioural response.

As can be seen from FIG. 2, in one embodiment of the present invention, the set of alternate response symbols 52 consist of five symbols shown as 52a, 52b, 52c, 52d, and 52e. Symbols 52a to 52e represent taking a deep breath, drinking a glass of water, eating a fruit or vegetable, drawing air through a plastic straw and stretching or relaxing, respectively.

Once a user of the device 10 experiences an urge to perform an acquired behavioural response which the user wishes to stop performing, the user activates the device 10 by means of the user-activatable input means 14. The input means 14 then generates the first signal S1 which is then received by the control means 20. The first signal S1 represents that the user has experienced an urge to perform an acquired behavioral response and that the user has activated the device 10. Upon receipt of the first signal S1 the control means 20 causes the display means 40 to display the set of alternate response symbols 52.

By requiring the user to make a conscious attempt to register the urge or cue onto the device 10 by activation input means 14 the user's acquired behavioural response to that urge will be interrupted. The interruption in the urge will assist the user in not negotiating with himself or herself and in not focusing on the acquired behavioural response which the user desires to eliminate.

In addition to the interruption of the urge, the device 10 will be activated and the display means 40 will begin displaying to the user the symbols representing the set of alternate responses 52. This induces the user to perform one of the alternative responses instead of the acquired behavioural response. After several interactions, the device 10 assists the user to "unlearn" his or her association between the physical, psychological and habitual stimuli which create the urge and performance of the acquired behavioural response. Also, at the same time, the device 10 assists the user to consider, practise and substitute alternative responses to the acquired behavioural responses.

The input means 14 is also capable of generating a second signal S2 upon activation of the input means 14 by the user. The second signal S2 which is generated upon activation of the input means 14 indicates whether the user selected to perform the acquired behavioural response or whether the user selected to perform one of the alternative responses. The second signal S2 can be generated at any time after the first signal S1 has been generated, but, generally, the user will not select a course of action until after the display means 20 has displayed the entire set of alternate response symbols 52.

The length of time it takes the display means 20 to display the set of alternate response symbols 52 should be relatively short to avoid losing the user's attention. Preferably the length of time should be under 1 minute, and more preferably about 10 seconds as shown in FIG. 2. If the user selects and inputs into the device 10 a course of action within the length of time it takes the display means 20 to display the set of alternate responses 52, the device 10 will return to a "de-activated" or "passive" state until the user reactivates the device 10 at the next occurrence of an urge.

If the user does not select and input a course of action into the device 10 within this length of time, then the display means 40 will display prompting symbols 54 after displaying the set of alternate response symbols 52. The prompting symbols 54 prompt the user to select and input into the device 10 whether to perform the acquired behavioural response or one of the alternative responses. The display means 40 will continue to display prompting symbols 54 until the second signal S2 is received by the control means 20.

In a preferred embodiment, after the second signal S2 is received by the control means 20, the user may input another second signal S2 within a short period of time, such as 15 seconds, indicating a different course of action. This provides a time period within which the user may change his or her selection or correct an inadvertent error.

In a further preferred embodiment, the input means 14 can not be activated for a further period of time, such as 10 minutes, after the short period of time expires. In this way, the user can not misuse the device 10.

Generally, the prompting symbols 54 can be any set of symbols or designs which keep the user's attention until the user makes a selection. Accordingly, prompting symbols 54 could be the set of alternate response symbols 52 displayed again and again. Or, as in the embodiment shown in FIG. 2, the prompting symbols 54 are a series of symbols representing a "bull's eye" building up over about a 5 second period. In this embodiment, the "bull's eye" will keep "rebuilding" until the user activates the input means 14 indicating the behavioural response the user has selected.

In a further embodiment, the control means 20 causes the display means 40 to display a positive symbol 56 if the second signal S2 indicates that the user selected to perform one of the alternative responses. Also, the control means 20 causes the display means 40 to display a negative symbol 58 if the second signal S2 indicates that the user selected to perform the acquired behavioural response.

Figure 3:
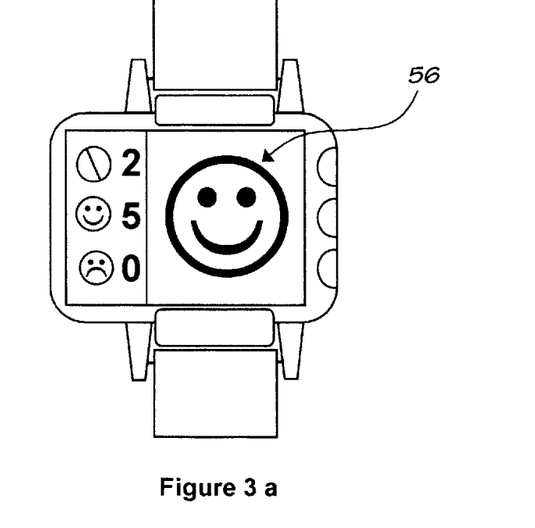
FIG. 3 is a drawing of an embodiment of the present invention displaying symbols used in a further embodiment of the present invention.

By positive symbol 56 is meant a pleasing or congratulatory symbol or design to act as a reward and encourage the user to continue selecting one of the alternative responses when subsequent urges occur. FIG. 3a shows a "happy face" as one possible positive symbol 56. Other potential positive symbols 56 could include fireworks or a picturesque view of a tranquil setting.

By negative symbol 58 is meant a disconcerting or disappointing symbol or design to act as a warning or penalty and discourage the user from selecting the acquired behavioural response when subsequent urges occur. FIG. 3b shows a "sad face" as one possible negative symbol 58. Other potential negative symbols 58 could include a skull and cross bones or a gloomy view of a distressing setting.

It is understood that there would be more than one positive symbol 56 such that the control means 20 causes the display means 40 to display several positive symbols 56 one after another or alternating between two in a manner similar to the display of the alternate response symbols 52. Likewise it is understood that there could be more than one negative symbol 58 such that the control means 20 causes the display means 40 to display several negative symbols 58 one after another or alternating between two in a manner similar to the display of the alternative response symbols 52.

In a preferred embodiment, the control means also comprises memory means shown generally as 22 in FIG. 1. Memory means 22 records that the user selected to perform one of the alternative responses or that the user selected to perform the acquired behavioural response during a predetermined time period. The memory means 22 could record the number of times each of these selections were made. In addition, the memory means 22 could record the time of day that these selections were made. Also, in the case of a selection to perform one of the alternative behavioural responses, the memory means 22 could record the number of times each of the different alternative responses were selected.

Figure 4:
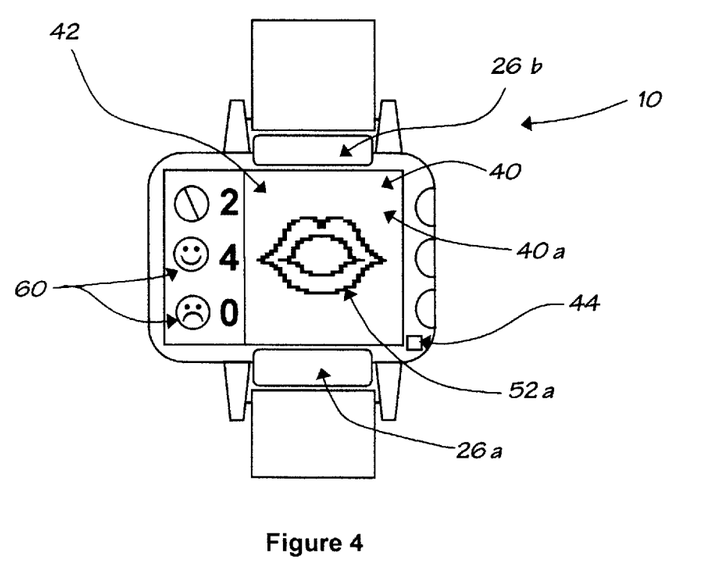
FIG. 4 is a drawing of a further embodiment of the present invention.

In a further preferred embodiment, the control means 20 comprises memory means 22 and causes the display means 40 to display a cumulative total (represented by numeral 60 in FIGS. 4 and 5) representing the number of times the user selected to perform one of the alternative responses and the number of times the user selected to perform the acquired behavioural response during the predetermined time period. The control means 20 could cause the display means 40 to display this total 60 continuously. This embodiment is shown in FIG. 4 where the cumulative total 60 is continuously shown on the left side of the device 40. On the other hand, the control means 20 could cause the display means 40 to display this total only in response to the user activating a specific switch.

At the end of the predetermined time period, the user may manually record elsewhere the accumulated totals for analysis, charting or professional appraisal. In a preferred embodiment, the device 10 may comprise means of downloading the accumulated totals for each predetermined time period onto an external data storage device.

In order to display various symbols such as the set of alternate response symbols 52 and the prompting symbols 54, the display means 40 generally comprises a visual component 42 to convey images by sight. In one embodiment, the display means 40 comprises a liquid crystal display 40a to display the symbols 52, 54, 56.

In a preferred embodiment, the display means 40 also comprises an audio component shown generally in FIG. 4 as 44. In this preferred embodiment, the audio component 44 of the display means 40 creates sounds to compliment the visual component. In other words, when each of the symbols in the set of alternative response symbols 52 is displayed on the visual component 42 of display means 40, the audio component 44 emits a sound which corresponds to or is suggestive of the symbol being displayed. For instance, when the visual component 42 of the display means 40 displays symbol 52b, representing the glass of water, the audio component 44 of the display means 40 could display or emit a sound suggestive of water such as the sound of a flowing stream or a wave hitting a shore.

Likewise, the audio component 44 of the display means 40 could act to increase the interaction between the device 10 and the user. For instance, after the visual component 42 of the display means 40 has displayed the set of alternative response symbols 52, the audio component 44 of the display means 40 could emit a sound such as a bell indicating to the user that he must make a selection and contemporaneously the prompting symbols would appear. While the prompting symbols are being displayed, a suitable tune or sound like a clock ticking could be emitted by the audio component 44 of the display means 40 to keep the user's attention and prompt the user to make a selection.

Furthermore, once a selection is made, a "reward" tune could accompany the display of the positive symbol 56 on the visual component 42 of the display means 40. Likewise, a "buzzer" or "warning tune" could accompany the display of the negative symbol 58.

The predetermined time period as described above could be selected manually by the user referring to an external time measuring apparatus to start and stop the time period. However, in a still further preferred embodiment, the device 10 comprises clock means 30 which is operable to measure the time. The clock means 30 may be coupled to the control means 20 to measure the predetermined time period automatically.

The clock means 30 may also be coupled to the display means 40 for displaying the time. Therefore, the device 10 may have a separate display means (not shown) for displaying the time continuously, even when the display means 40 is displaying the symbols 52, 54, 56. However, it is preferable if the device 10 displays the time on the display means 40 when the display means 40 is not displaying the symbols 52, 54, 56. In this way, the display means 40 may occupy a larger area on the surface of the device 10, and the time will not distract the user's attention from the symbols 52, 54, 56, when the user is interacting with the device 10. This embodiment is shown in FIG. 5 which should be contrasted with FIG. 4.

The device also comprises fastening means 70, such as a strap, for fastening the device to the user's wrist. Therefore, the combination of the clock means 30 and fastening means 70 allow the device 10 to act as a conventional wrist watch when the device 10 is in its "passive" state. In other words, when the user is not experiencing an urge and interacting with the device 10, the device 10 will have the outward appearance of a conventional wrist watch. And, when an urge occurs, the device 10 will be readily available to the user in order for the user to interact with it.

The preferred embodiment of the device 10, as shown in FIG. 4, shows the input means 14 as comprising at least two activating means 26a and 26b. These activating means may be buttons or heat sensitive surfaces or any other means whereby a user could act upon the device 10 to activate the input means 14.

Figure 5:
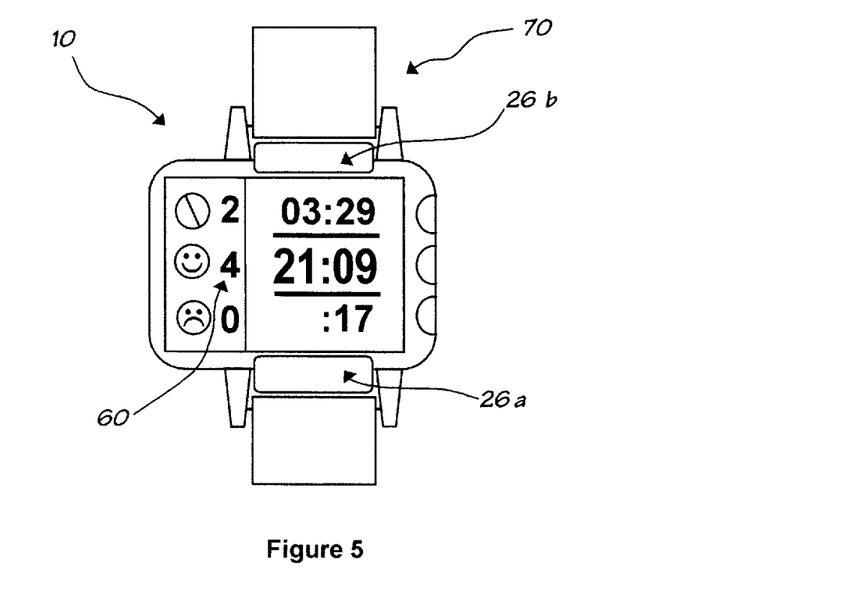
FIG. 5 is a drawing of a further embodiment of the present invention.

As can be seen from FIGS. 4 and 5, one activating means 26a may be larger than the other activating means 26b. In this way activating means 26a is more easily accessible to the user than activating means 26b. Since activating means 26a is more easily accessible, it is preferred that activating means 26a causes the input means to generate a second signal 52 which indicates that the user selected to perform one of the alternative responses. It is also preferable that the larger activating means 26a also causes the input means 14 to generate the first signal S1.

As stated above, the present device 10 may be used by a user to change any acquired behavioural response. These acquired behavioural responses may include using tobacco products including smoking cigarettes or cigars, drinking excessive alcohol, or over-eating. It is apparent that several of the parameters of the device 10 may be customized for the specific acquired behavioural response the user wishes to overcome. These parameters include the set of alternative response symbols 52, the timing of display means 40, and the accumulated total computation. A further preferred embodiment provides interchangeable preprogrammed chips, such as ROM chips, which comprise part of the control means 20 and are removably received into the control means 20 and change the device's 10 parameters so that the same device 10 may be customized to assist a user to change specific acquired behavioural responses.

In particular, one of the acquired behavioural responses which the present device 10 and method is well suited for is smoking.

Smoking is a learned habit. People learn to smoke in situations that repeat themselves such as places, activities, occasions and states of mind. In addition, smoking becomes associated with certain effect expectations, such as pleasure, relaxation, stimulation and with the feeling of control in altering the states of body and mind.

When people attempt to quit smoking, they have to deal with every particular personal association or stimuli that triggers the urge to smoke. The stimuli which triggers the urge to smoke may be different for each person. However, what is common in most people that attempt to stop smoking is the feeling of void when these urges are not addressed. The present invention assists a smoker to relearn the behavioural responses to these stimuli and lessen these feelings of void.

In addition to the psychological and habitual associations a smoker may have with smoking, a smoker becomes physically addicted to smoking as the user's tolerance to nicotine increases. Accordingly, a regular smoker will likely eventually become physiologically as well as psychologically and habitually dependent on cigarettes.

Therefore, it is preferable that if the present invention is used to assist a smoker to overcome his or her psychological and habitual dependencies on smoking, the present invention should be used in conjunction with a device and method which addresses a smoker's physiological dependency to smoking.

One device and method which addresses a smoker's physiological dependencies to smoking is the transdermal nicotine patch and associated therapy. This therapy consists of applying a nicotine patch to the skin of the smoker. This patch provides for nicotine to flow through the skin of the smoker and satisfy the smoker's physiological dependencies to smoking.

The application of a nicotine patch effectively reduces the severity of the early abstinence syndrome. It makes it physically more comfortable for the patient to abstain from cigarettes. However, nicotine patch therapy does not address the psychological and habitual cues to smoke which a smoker experiences even when the physiological cravings have subsided or are effectively substituted for by the nicotine patch therapy. Accordingly, in order to avoid the risk of cognitive distortion occurring in response to the smoker's psychological and habitual cues, the smoker needs to learn to satisfy and neutralize these psychological and habitual cues by developing adequate alternative response behaviours, that is, new behavioural patterns to replace smoking with other things to do, as is provided through the device 10 and method of the present invention. Accordingly, the device 10 and method of the present invention used in conjunction with nicotine patch therapy complement each other both in their simplicity of use and desired goals.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property or privilege is claimed are defined as follows:

1. A user-interactive device for promoting alternative responses to acquired behavioural responses comprising:

a user-activatable input means for generating signals upon activation by a user, including a first signal representing an occurrence of an urge of the user to perform an acquired behavioural response;

a display means for displaying a set of alternate response symbols representing alternative responses to the acquired behavioural response;

a control means connected to the input means to receive signals, including the first signal, from the input means;

wherein said control means causes the display means to display the set of symbols after receiving the first signal; and     wherein the user activatable input means generates a second signal upon activation of the input means by the user after the first signal has been generated, said second signal indicating whether the user selected to perform the acquired behavioural response or whether the user selected to perform one of the alternative responses.

2. The device as defined in claim 1 wherein the device is a combination wrist watch and user-active device further comprising:

clock means operable to measure time and coupled to the display means; and     fastening means for fastening the device to the user's wrist.

3. The device as defined in claim 1 wherein the display means displays prompting symbols after displaying the set of alternate response symbols and until the second signal is received by the control means.

4. The device as defined in claim 3 wherein if the second signal indicates that the user selected to perform one of the alternative responses, the control means causes the display means to display a positive symbol, and if the second signal indicates that the user selected to perform the acquired behavioural response, the control means causes the display means to display a negative symbol.

5. The device as defined in claim 4 wherein the control means comprises memory means for recording that the user selected to perform one of the alternative responses or that the user selected to perform the acquired behavioural response during a predetermined time period and wherein the control means controls the display means to display a cumulative total representing the number of times the user selected to perform one of the alternative responses and the number of times the user selected to perform the acquired behavioural response during the predetermined time period.

6. The device as defined in claim 5 wherein the display means comprises visual and audio components.

7. The device as defined in claim 6 wherein the device is a combination wrist watch and user-interactive device, further comprising:

clock means operable to measure time and coupled to the display means for displaying time and coupled to the control means for measuring the predetermined time period; and fastening means for fastening the device to the user's wrist.

8. The device as defined in claim 5 wherein the user activatable input means comprises at least two activating means which activate the input means such that one activating means is more easily accessible to the user than the other activating means and wherein the more easily accessible activating means causes the input means to generate the second signal which indicates that the user selected to perform one of the alternative responses.

9. The device as defined in claim 7 wherein the user activatable input means comprises at least two activating means which activate the input means such that one activating means is more easily accessible to the user than the other activating means and wherein the more easily accessible activating means causes the input means to generate the second signal which indicates that the user selected to perform one of the alternative responses.

10. The device as defined in claim 9 wherein for a short period of time after the control means receives the second signal, the user activatable input means may generate another second signal upon re-activation of the input means by the user, said other second signal indicating whether the user selected to perform the acquired behavioural response or whether the user selected to perform one of the alternative responses; and wherein for a further period of time, after the short period of time, the input means can not generate a first signal or a second signal.

11. A user-interactive, smoking reduction system for promoting alternative responses to smoking, comprising;

a user-activatable input means for generating signals upon activation by the user, including a first signal representing an occurrence of an urge of the user to smoke;

a display means for displaying a set of alternate response symbols representing alternative responses to smoking;

a control means connected to the input means to receive signals, including the first signal, from the input means;

wherein said control means causes the display means to display the set of symbols after receiving the first signal; and wherein the user activatable input means generates a second signal upon activation of the input means by the user after the first signal has been generated, said second signal representing whether the user selected to smoke or whether the user selected to perform one of the alternative responses.

12. A smoking reduction system as defined in claim 11 used in conjunction with transdermal nicotine patch therapy.

13. The device as defined in claim 11 wherein the display means displays prompting symbols after displaying the set of alternate response symbols and until the second signal is received by the control means; and wherein the display means comprises visual and audio components.

14. The device as defined in claim 13 wherein if the second signal indicates that the user selected to perform one of the alternative responses, the control means causes the display means to display a positive symbol, and if the second signal indicates that the user selected to smoke, the control means causes the display means to display a negative symbol; and wherein the control means comprises memory means for recording that the user performed one of the alternative responses or that the user selected to smoke during a predetermined time period and wherein the control means controls the display means to display a cumulative total representing the number of times the user selected to perform one of the alternative responses and the number of times the user smoked during the predetermined time period.

15. The device as defined in claim 14 wherein the device is a combination wrist watch and user-interactive device, further comprising:

clock means operable to measure time and coupled to the display means for displaying time and coupled to the control means for measuring the predetermined time period; and fastening means for fastening the device to the user's wrist.

16. The device as defined in claim 15 wherein the user activatable input means comprises at least two activating means which activate the input means such that one activating means is more easily accessible to the user than the other activating means and wherein the more easily accessible activating means causes the input means to generate the second signal which indicates that the user selected to perform one of the alternative responses.

17. A smoking reduction system as defined in claim 16 used in conjunction with transdermal nicotine patch therapy.

18. A method for promoting alternative responses to acquired behavioural responses by use of a user-interactive device which a user interacts with, said method comprising:

generating a first signal upon activation of said device by a user, said first signal representing an occurrence of an urge of the user to perform an acquired behavioural response;

displaying a set of alternate response symbols representing alternative responses to the acquired behavioural responses in response to said first signal;

generating a second signal upon activation of the device after the first signal has been generated, said second signal indicating whether the user selected to perform the acquired behavioural response or whether the user selected to perform one of the alternative responses.

19. A method as claimed in claim 18 further comprising the step of displaying the number of times the user selects to perform the acquired behavioural response and the number of times the user selects to perform one of the alternate behavioural responses in a predetermined time period.

20. A method as claimed in claim 19 wherein said acquired behavioural response is smoking.

* * * * *